United States Patent
Ashida

(10) Patent No.: US 8,432,136 B2
(45) Date of Patent: Apr. 30, 2013

(54) BATTERY PACK, BATTERY CHARGER, AND BATTERY PACK SYSTEM

(75) Inventor: Kazuhide Ashida, Saku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 347 days.

(21) Appl. No.: 12/739,969

(22) PCT Filed: Sep. 30, 2008

(86) PCT No.: PCT/JP2008/067735
§ 371 (c)(1),
(2), (4) Date: Apr. 27, 2010

(87) PCT Pub. No.: WO2009/057404
PCT Pub. Date: May 7, 2009

(65) Prior Publication Data
US 2010/0264877 A1    Oct. 21, 2010

(30) Foreign Application Priority Data

Oct. 30, 2007    (JP) .................. 2007-281724

(51) Int. Cl.
*H02J 7/04* (2006.01)
*H02J 7/16* (2006.01)

(52) U.S. Cl.
USPC ........................................ 320/152

(58) Field of Classification Search ........... 320/106, 320/116, 134, 152
See application file for complete search history.

(56) References Cited

U.S. PATENT DOCUMENTS

| | | | | |
|---|---|---|---|---|
| 5,870,025 | A * | 2/1999 | Hinohara | 340/636.12 |
| 7,449,863 | B2 * | 11/2008 | Tashiro | 320/112 |
| 7,714,533 | B2 * | 5/2010 | Odaohhara | 320/106 |
| 7,973,515 | B2 * | 7/2011 | Densham et al. | 320/130 |
| 2001/0017531 | A1 * | 8/2001 | Sakakibara et al. | 320/106 |
| 2007/0188135 | A1 | 8/2007 | Odaohhara | |

FOREIGN PATENT DOCUMENTS

| | | |
|---|---|---|
| JP | 05-342423 | 12/1993 |
| JP | 05-342433 | 12/1993 |
| JP | 11 317245 | 11/1999 |
| JP | 2000 23383 | 1/2000 |
| JP | 2001 274744 | 10/2001 |
| JP | 2004 172058 | 6/2004 |
| JP | 2004 304940 | 10/2004 |
| JP | 2007 141572 | 6/2007 |
| JP | 2007 215251 | 8/2007 |
| JP | 2009 112111 | 5/2009 |

OTHER PUBLICATIONS

Machine Translation for JP 2004-304940.*
U.S. Appl. No. 12/721,037, filed Mar. 10, 2010, Ashida.
Office Action issued Oct. 2, 2012 in Japanese Patent Application No. 2007-281724 filed Oct. 30, 2007 (Partial English Translation).

* cited by examiner

*Primary Examiner* — Ramy Ramadan
(74) *Attorney, Agent, or Firm* — Oblon, Spivak, McClelland, Maier & Neustadt, L.L.P.

(57) ABSTRACT

A battery pack includes: a plurality of rechargeable batteries (11a to 11n) connected in series or in parallel; a voltage detector (13) for detecting voltages of the respective batteries; a calculator (15) for calculating optimal charging current values based on the voltages of the respective batteries detected by the voltage detector so as to recharge the respective batteries; and a communicator (19) for transmitting the charging current values calculated by the calculator to a battery charger (3).

4 Claims, 8 Drawing Sheets

BATTERY PACK, BATTERY CHARGER, AND BATTERY PACK SYSTEM

TECHNICAL FIELD

The present invention relates to a rechargeable battery pack, a battery charger, and a rechargeable battery pack system, which are used for a hybrid vehicle, a running power source for an electrically power assisted cycle, and the like. More specifically, the present invention relates to an interface between the rechargeable battery pack and the battery charger, and a technique for a control system of the battery charger.

BACKGROUND ART

In a circuit configuration of a conventional battery pack system illustrated in FIG. 1, a battery charger 3e had controlled a charging voltage and a charging current so as to supply the charging voltage and the charging current to a battery pack 1e. For example, as illustrated in FIG. 2, a battery charge had been controlled by a method of a CCCV charge, i.e. recharging at a set current Is in a constant current charge period T1, and recharging at a set voltage Vs in a constant voltage charge period T2.

Thus, the conventional battery pack system had recharged a secondary battery (hereinafter, referred to as a battery) in the battery pack, while the battery charger had monitored the charging voltage and the charging current.

Meanwhile, there were cases where the conventional battery pack system could not recharge the battery in the battery pack appropriately depending on conditions of a temperature of the battery pack and an internal resistance of the battery.

As for a technique for the conventional battery pack system, a battery charger described in PTL 1 has been known. The battery charger includes a first charge controller for recharging a battery so that a charge amount of the battery becomes a first charge amount, a second charge controller for recharging the battery so that the charge amount of the battery becomes a second charge amount smaller than the first charge amount, and a selector for selecting between charge processing by the first charge controller and charge processing by the second charge controller.

In other words, the conventional battery charger selects between a charge method for prioritizing battery life and a charge method for prioritizing a reduction of a charge time when recharging the battery. The battery charger can also select other methods depending on temperature and user purposes.

CITATION LIST

Patent Literature
  [PTL 1] Japanese Patent Application Laid-Open Publication No. 2000-23383

SUMMARY OF INVENTION

However, the conventional battery charger described in PTL 1 did not include a method in which a battery pack could specify a charging current with respect to a battery charger. Accordingly, there was a problem of the battery charger incapable of recharging the battery pack appropriately according to a condition of the battery pack.

To solve the above-mentioned problem, it is an object of the present invention to provide a battery pack, a battery charger and a battery pack system capable of recharging the battery pack in an optimal condition and in a short period of time according to a condition of the battery pack.

A battery pack according to a first aspect of the present invention is a rechargeable battery pack to be recharged by a battery charger, including: a plurality of rechargeable batteries connected in series or in parallel; a voltage detector for detecting voltages of the respective rechargeable batteries; a calculator for calculating optimal charging current values based on the voltages of the respective batteries detected by the voltage detector so as to recharge the respective batteries; and a communicator for transmitting the charging current values calculated by the calculator to the battery charger.

The battery pack according to the first aspect of the present invention may further include: a temperature sensor for measuring temperatures of the batteries; an input circuit in which a battery charger condition signal indicating a condition of the battery charger is input from the battery charger; an output circuit that outputs a battery pack condition signal indicating a condition of the battery pack to the battery charger; and a controller for controlling the voltage detector, the calculator, the communicator, the input circuit, and the output circuit. The calculator calculates optimal current values based on the voltages of the respective batteries detected by the voltage detector and the temperatures of the respective batteries measured by the temperature sensor.

The battery pack according to the first aspect of the present invention may further include: a power supply that is activated by the battery charger condition signal input from the battery charger via the input circuit, and supplies a current for operating the controller to the controller.

A battery charger according to a second aspect of the present invention is a battery charger for recharging the battery pack according to the first aspect of the present invention, including: a current controller for supplying currents according to the charging current values from the battery pack to the batteries in the battery pack.

A battery pack system according to a third aspect of the present invention includes: a battery charger; and a rechargeable battery pack to be recharged by the battery charger. The battery pack includes: a plurality of rechargeable batteries connected in series or in parallel; a voltage detector for detecting voltages of the respective rechargeable batteries; a calculator for calculating optimal charging current values based on the voltages of the respective batteries detected by the voltage detector so as to recharge the respective batteries; and a communicator for transmitting the charging current values calculated by the calculator to the battery charger. The battery charger comprises a current controller that supplies currents according to the charging current values from the battery pack to the batteries in the battery pack.

According to the battery pack of the first aspect of the present invention, the voltage detector detects the voltages of the respective batteries, the calculator calculates the optimal charging current values based on the detected voltages of the respective batteries so as to recharge the respective batteries, the communicator transmits the calculated charging current values to the battery charger, and the current controller of the battery charger supplies the currents according to the charging current values from the battery pack to the batteries in the battery pack.

Namely, the battery pack calculates the optimal charging current values and specifies the charging current values with respect to the battery charger, thereby controlling the battery charger. Therefore, the battery pack is recharged in an optimal condition and in a short period of time according to the condition of the battery pack.

DESCRIPTION OF EMBODIMENTS

Hereinafter, a description will be made below in detail of a battery pack, a battery charger, and a battery pack system in examples according to the present invention with reference to the drawings.

EXAMPLE 1

Figure 1:
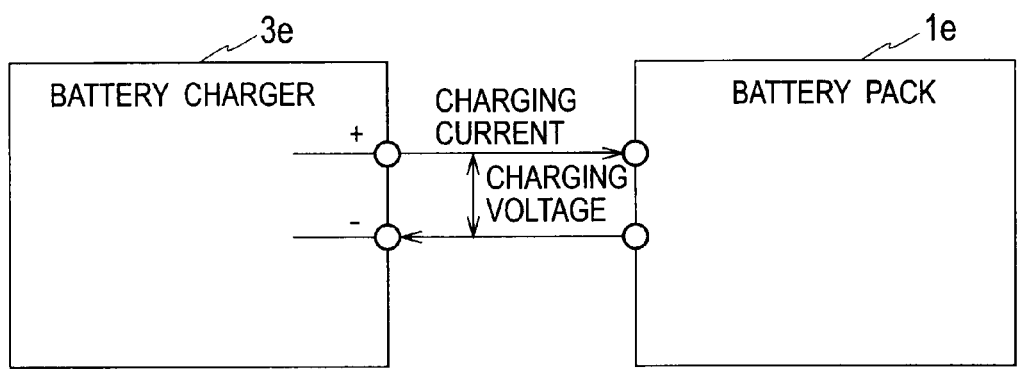
FIG. 1 is a circuit configuration diagram of a conventional battery pack system.
Figure 2:
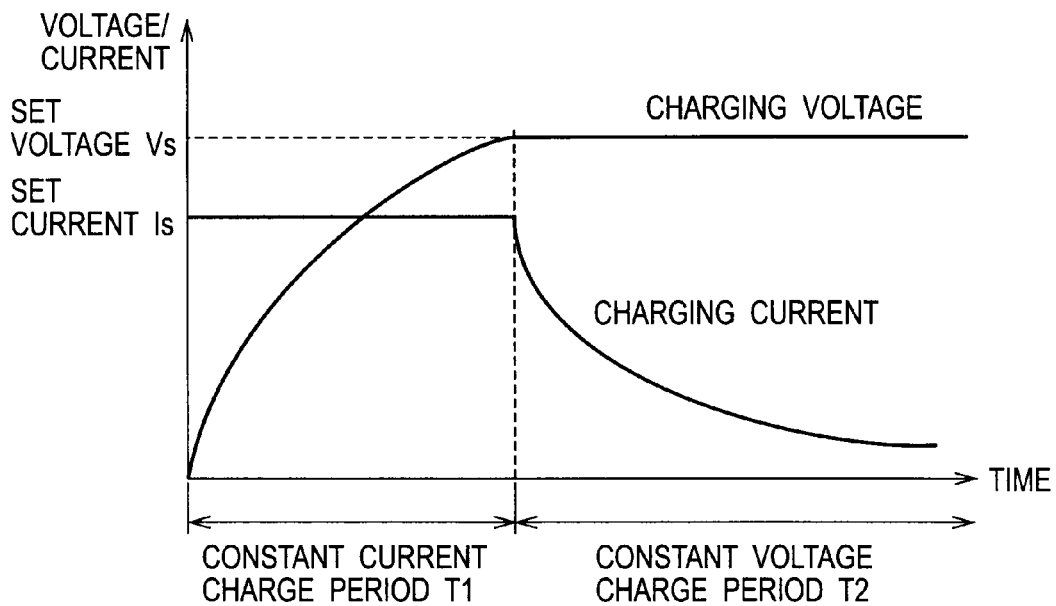
FIG. 2 is a diagram for explaining charge operations of a battery pack by a battery charger in a conventional battery pack system.
Figure 3:
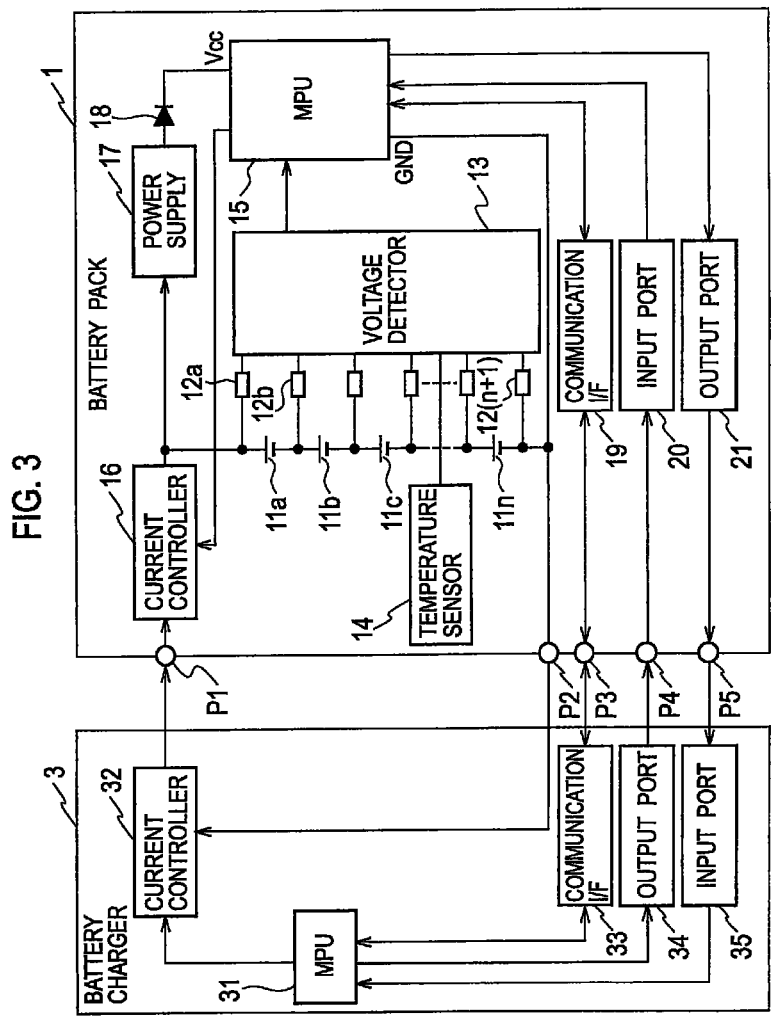
FIG. 3 is a circuit configuration diagram of a battery pack system in Example 1.

FIG. 3 is a circuit configuration diagram of a battery pack system of Example 1. In FIG. 3, the battery pack system includes a rechargeable battery pack 1, and a battery charger 3 for recharging rechargeable batteries in the battery pack 1.

The battery pack system monitors charged conditions of the batteries by a voltage detector for detecting voltages of the respective batteries in the battery pack 1 and a temperature sensor for sensing temperatures of the respective batteries, calculates current values in this point for recharging the batteries by a charging current calculator according to the monitored data, and transmits the current values to the battery charger via a communication I/F, thereby controlling charging currents.

The battery pack 1 includes a plurality of rechargeable batteries 11a to 11n (hereinafter, "n" means that an arbitrary number of one or more batteries are connected) connected in series, a plurality of resistors 12a to 12(n+1) (hereinafter, "n" means that one or more of resistors with the same number as the batteries are connected) connected to both terminals of the rechargeable batteries 11a to 11n, a voltage detector 13 for detecting voltages of the rechargeable batteries 11a to 11n, a temperature sensor 14 for sensing temperatures of the rechargeable batteries 11a to 11n, a microprocessor unit (MPU) 15 for controlling each component, a current controller 16, a communication interface (communication I/F) 19, an input port 20, and an output port 21.

The current controller 16 controls charging currents from the battery charger 3 via a port P1. The controlled charging currents are supplied to the batteries 11a to 11n and a power supply 17. The power supply 17 generates power by the charging currents from the battery charger 3 and voltages of the batteries 11a to 11n. Then, the power is supplied to the MPU 15 via a diode 18, whereby the MPU is operated.

The communication I/F 19 (communicator) performs data communication with the battery charger 3. The input port 20 inputs a battery charger condition signal indicating a condition of the battery charger 3 from the battery charger 3 so as to output to the MPU 15. The output port 21 outputs a battery pack condition signal indicating a condition of the battery pack 1 from the MPU 15 to the battery charger 3.

In addition, the battery charger 3 includes an MPU 31 for controlling each component, a current controller 32 for controlling charging currents, a communication I/F 33 for performing communication with the battery pack 1, an output port 34 for outputting a battery charger condition signal to the battery pack 1, and an input port 35 for inputting a battery pack condition signal from the battery pack 1.

The MPU 15 (calculator) calculates optimal charging current values for recharging each of the batteries based on voltages of each of the batteries detected by the voltage detector 13 and temperature data sensed by the temperature sensor 14. Then, the communication I/F 19 transmits the optimal charging current values calculated by the MPU 15 to the battery charger 3.

As described above, in the battery pack 1, the voltage detector 13 detects the voltages of the respective batteries 11a to 11n, the MPU 15 calculates the optimal charging current values for recharging each battery based on the detected voltages of the respective batteries 11a to 11n and the temperature data from the temperature sensor 14, and the communication I/F 19 transmits the calculated charging current values to the battery charger 3. In the battery charger 3, the current controller 32 supplies currents according to the charging current values from the battery pack 1 to the batteries 11a to 11n in the battery pack 1.

Namely, the battery pack 1 calculates the optimal charging current values, and specifies the charging current values with respect to the battery charger 3, so as to control the battery charger 3. Thus, the battery charger 3 can recharge the battery pack 1 in an optimal condition and in a short period of time according to the condition (e.g. temperature and internal resistance) of the battery pack 1.

Moreover, the battery charger 3 and the battery pack 1 can mutually indicate the own conditions each other by use of the input port 20 and output port 21. In other words, when the battery charger 3 is in a condition capable of recharging the batteries, the MPU 31 in the battery charger 3 outputs a signal indicating the condition capable of recharging the battery pack 1 to the MPU 15 from the output port 34 in the battery charger side via the input port 20 in the battery pack side. Thus, the battery charger 3 indicates the charge-standby condition with respect to the battery pack 1.

In addition, when the MPU 15 in the battery pack 1 detects the connection to the battery charger 3 by the signal from the input port 20, the MPU 15 evaluates the conditions of the batteries 11a to 11n. When the batteries 11a to 11n are in a rechargeable condition, a signal in an output-standby condition is output to the battery charger 3 from the output port 21 in the battery pack side. Then, the battery pack 1 indicates the charge-standby condition to the battery charger 3.

As described above, the signals from the input port 20 and the output port 21 are used as handshake signals. Then, the batteries 11a to 11n are recharged when both the battery pack 1 and the battery charger 3 are only in a normal condition, thereby completing recharging securely. Moreover, when the battery charger 3 and the battery pack 1 are both in the normal condition, the optimal charging current values calculated by the MPU 15 are indicated to the battery charger 3 via the communication I/F 19. The charging current values are output to the battery charger 3 from the output port 21 as coded values.

EXAMPLE 2

Figure 4:
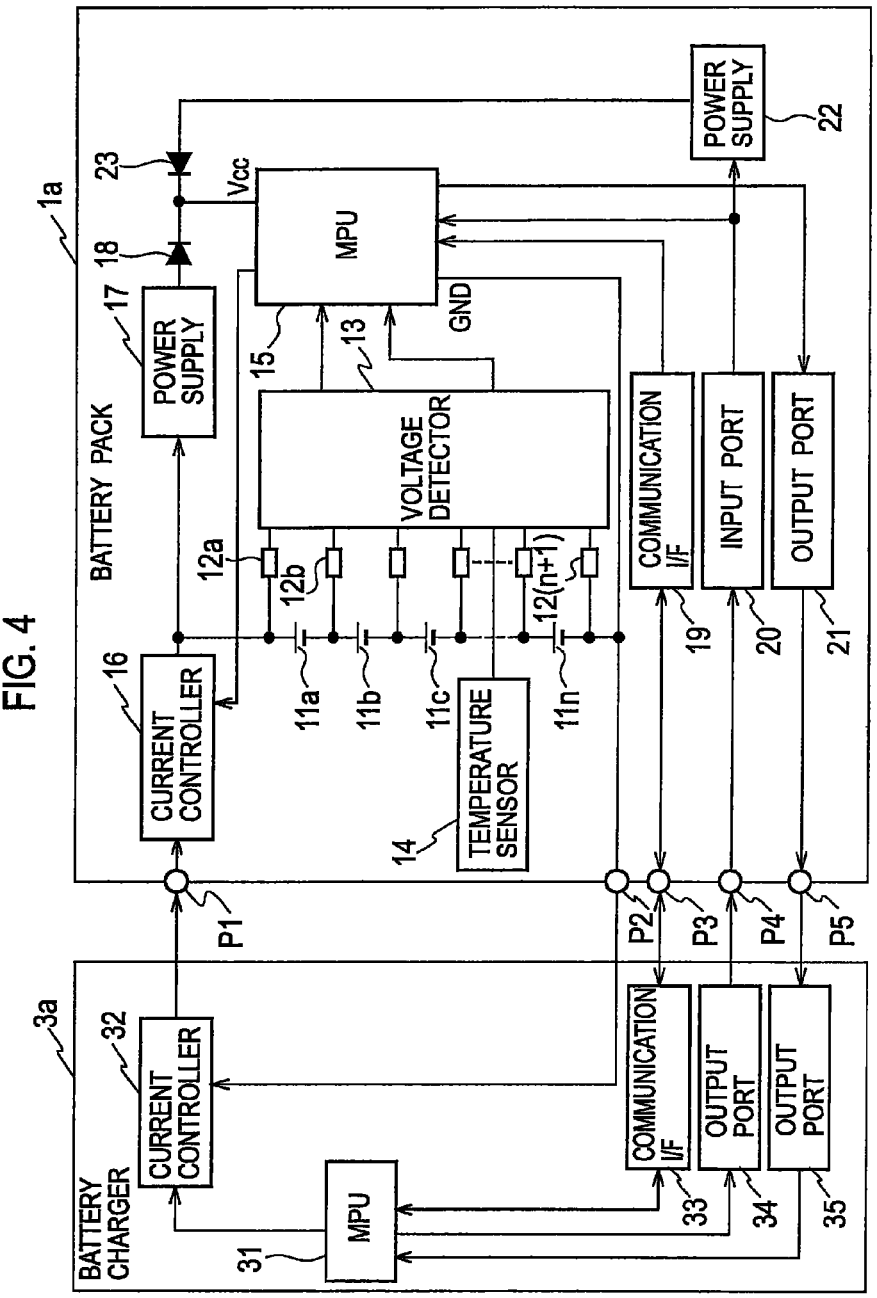
FIG. 4 is a circuit configuration diagram of a battery pack system in Example 2.

FIG. 4 is a circuit configuration diagram of a battery pack system of Example 2. In FIG. 4, the battery pack system further includes a diode 23, and a power supply 22 that is activated by a battery charger condition signal input from the battery charger 3 via the input port 20 and supplies a current to the MPU 15 via the diode 23 to operate the MPU 15, in addition to the configuration of the battery pack system of Example 1 illustrated in FIG. 3.

Note that, in Example 2, the same components as Example 1 are indicated by the same numerals, and explanations thereof are omitted.

In the configuration of Example 2 as described above, the power supply 22 is activated by the battery charger condition signal input from the battery charger 3 via the input port 20, and supplies the current to the MPU 15 via the diode 23 to operate the MPU 15. Therefore, the power supply 22 operates the MPU 15 in the battery pack 1 even when the battery charger 3 is not in a state supplying the charging currents and the batteries in the battery pack 1 are not sufficiently recharged enough to operate the MPU 15.

EXAMPLE 3

Figure 5:
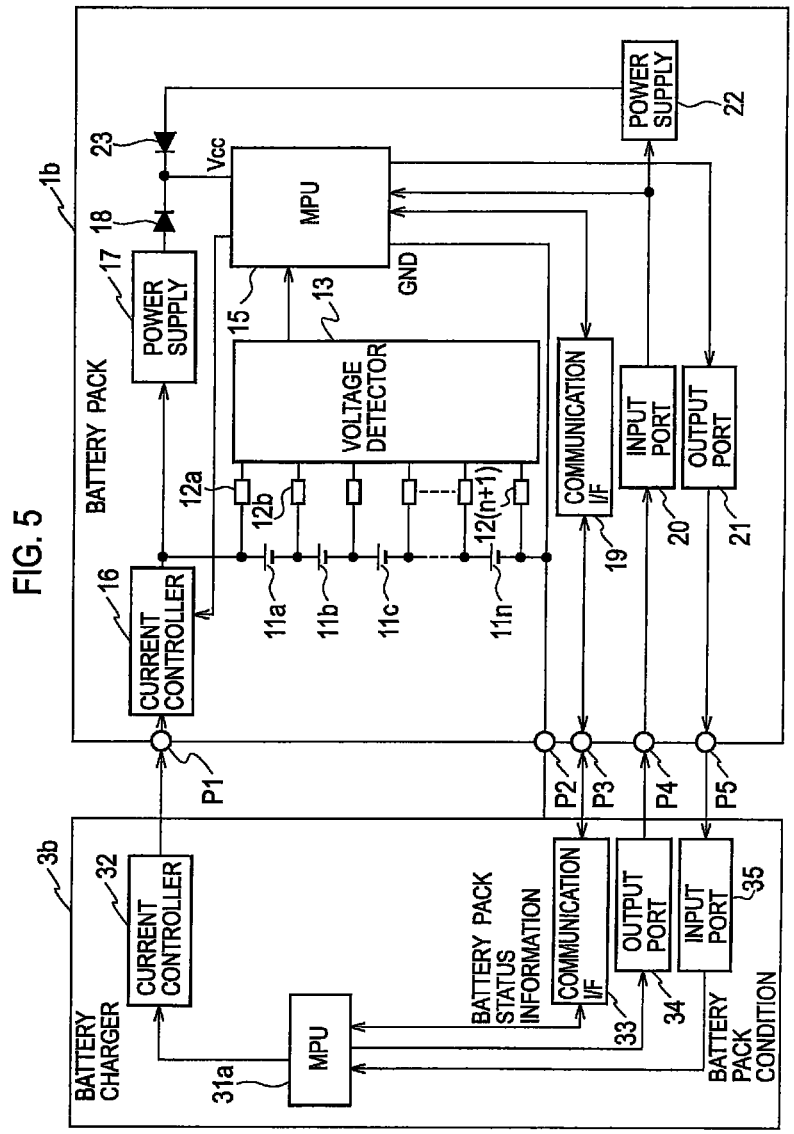
FIG. 5 is a circuit configuration diagram of a battery pack system in Example 3.

FIG. 5 is a circuit configuration diagram of a battery pack system of Example 3. In FIG. 5, the battery pack system includes a different component, an MPU 31a in a battery charger 3b, from the battery pack system of Example 2 illustrated in FIG. 4.

Note that, in Example 3, the same components as Example 2 illustrated in FIG. 4 are indicated by the same numerals, and explanations thereof are omitted.

The communication I/F 19 in a battery pack 1b outputs a status signal of the battery pack 1b in the MPU 15 to a communication I/F 33 in the battery charger 3b. Then, the output port 21 in the battery pack 1b outputs a charge available condition signal of the battery pack 1b to the input port 35 in the battery charger 3b.

The communication I/F 33 in the battery charger 3b obtains the status signal of the battery pack 1 from the communication I/F 19. Then, the input port 35 inputs the charge available condition signal of the battery pack 1 from the output port 21.

The MPU 31a in the battery charger side transmits a signal for recharging the batteries to the current controller 32 when the status signal from the communication I/F 33 and the charge available condition signal from the input port 35 are both only in a normal condition.

Thus, only when the battery pack 1 and the battery charger 3 are normally connected and recharging is in a normally available condition, the charging currents can be applied to the batteries 11a to 11n. Therefore, an electrical shock accident and a short circuit accident caused by allowing the charging currents are avoided when the battery pack 1 is in an anomalous charge condition or the battery pack 1 is not connected.

EXAMPLE 4

Figure 6:
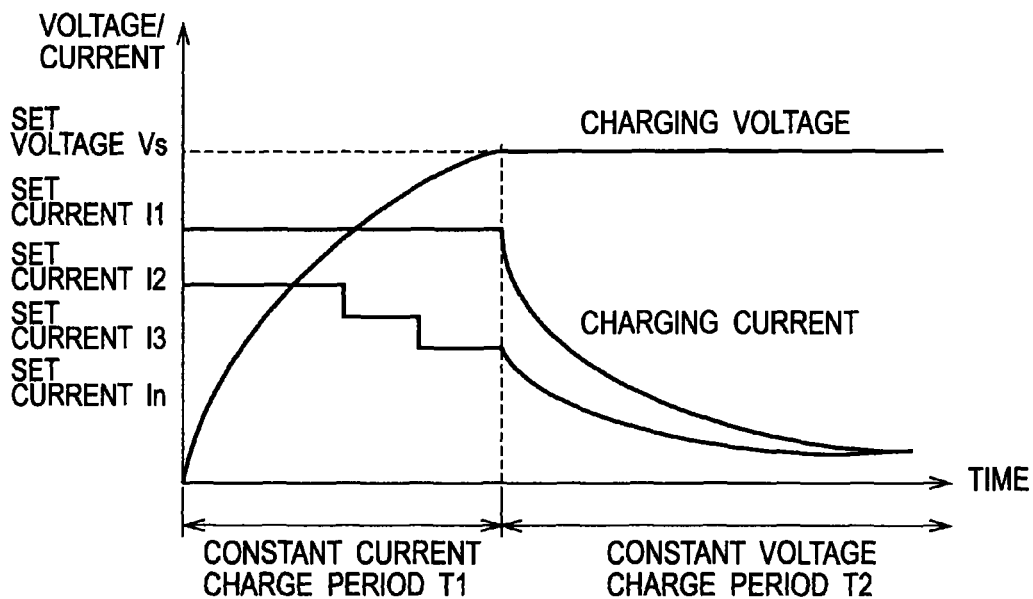
FIG. 6 is a diagram for explaining charging current specifying operations and charge mode specifying operations of a battery pack system in Example 4.

FIG. 6 is a diagram for explaining charging current specifying operations and charge mode specifying operations of a battery pack system in Example 4. A circuit diagram of Example 4 is approximately the same as the circuit diagram illustrated in FIG. 3.

The MPU 15 in the battery pack 1 of Example 4 outputs the charging current values and other information to the communication I/F 19. The communication I/F 19 outputs the charging current values and the other information from the MPU 15 to the communication I/F 33 in the battery charger 3.

For example, as illustrated in FIG. 6, the charging current values are specified in a phased manner, or a constant current charge mode (constant current charge period T1) and a constant voltage charge mode (constant voltage charge period T2) are specified, from the battery pack 1 to the battery charger 3. Thus, optimal charge characteristics can be achieved.

In addition, the MPU 15 in the battery pack 1 can specify the charging current values per communication. Therefore, a battery charge control can be performed sensitively.

Furthermore, the MPU 15 can also transmit information of the charging current values and the charge modes to the battery charger 3 by use of the input port 20 and the output port 21.

EXAMPLE 5

Figure 7:
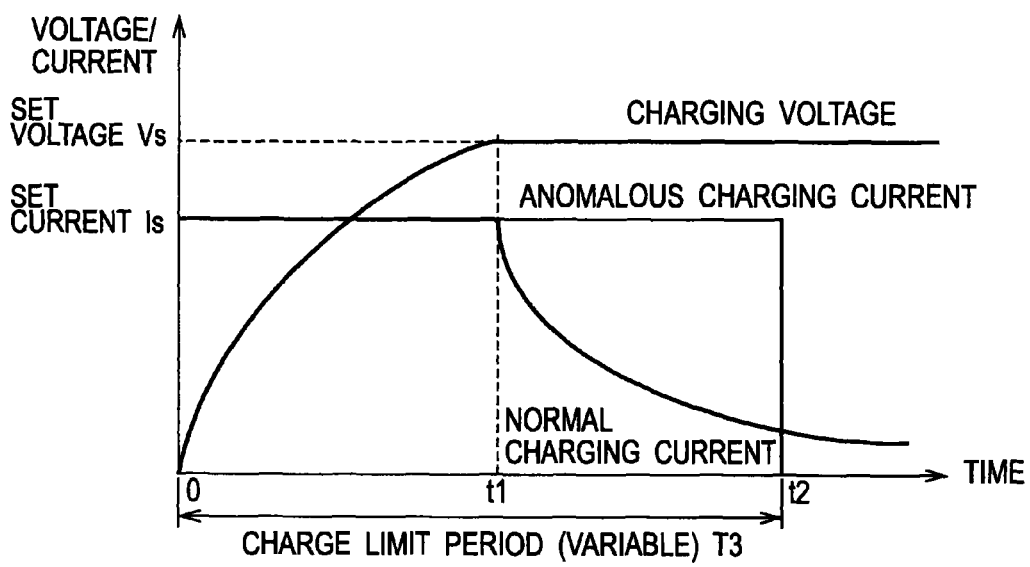
FIG. 7 is a diagram for explaining a charge time limit of a battery pack system in Example 5.

FIG. 7 is a diagram for explaining a charge time limit of a battery pack system in Example 5. A circuit diagram of Example 5 is approximately the same as the circuit diagram illustrated in FIG. 3.

The MPU 15 in the battery pack 1 of Example 5 transmits information of a battery charge limit period via the communication I/F 19 or the input port 20 and output port 21. The MPU 31 in the battery charger 3 controls recharging of the batteries 11a to 11n in the battery pack 1 so as to stop within the charge limit period in accordance with the charge limit period from the battery pack 1.

Thus, as illustrated in FIG. 7, even when an anomalous charging current is kept applying during recharging due to a trouble of the battery pack 1, the MPU 31 in the battery charger 3 stops recharging the batteries 11a to 11n in the charge limit time T3. This avoids the battery pack 1 from overheating and igniting.

Moreover, the MPU 15 in the battery pack 1 can also vary the charge limit time T3 at arbitrary timing by use of the communication I/F 19 or the input port 20 and output port 21. For example, the charging currents to the batteries 11a to 11n need to be reduced at low temperature. In this case, the batteries 11a to 11n are recharged while sufficiently taking a time by extending the charge limit time T3.

EXAMPLE 6

Figure 8:
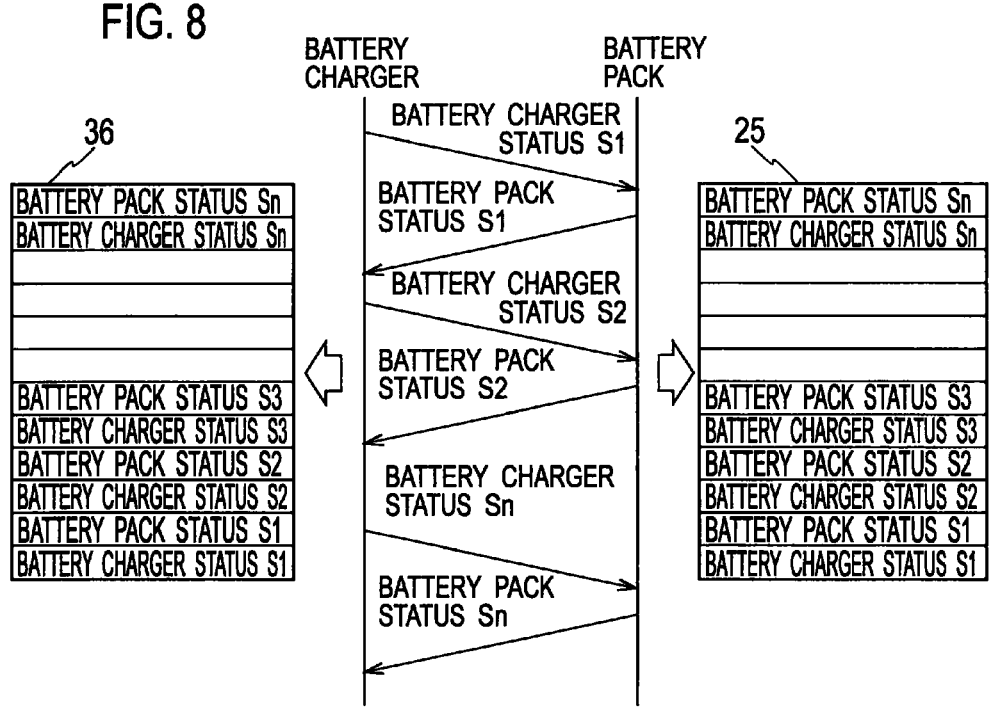
FIG. 8 is a diagram for explaining status storage operations in a battery pack and a battery charger of Example 6.

FIG. 8 is a diagram for explaining status storage operations in a battery pack and a battery charger of Example 6. A circuit diagram of Example 6 is approximately the same as the circuit diagram illustrated in FIG. 3.

The battery pack 1 of Example 6 transmits a status of the battery pack 1 to the battery charger 3 via the communication I/F 19 or the input port 20 and output port 21. Also, the battery charger 3 transmits a status of the battery charger 3 to the battery pack 1 via the communication I/F 33 or the input port 34 and the output port 35.

As illustrated in FIG. 8, in the battery pack 1 and the battery charger 3, the battery pack status transmitted to the battery charger side and the battery charger status received from the battery charger side are stored in a battery pack side memory 25 in chronological order. Also, the battery charger status transmitted to the battery pack and the battery pack status received from the battery pack are stored in a battery charger side memory 36 in chronological order.

Therefore, when a trouble is caused in either the battery pack 1 or the battery charger 3, a condition at the trouble can be found by use of the status information stored in the other side even when the status information at the trouble is not stored in the troubled side. Thus, it can be easily analyzed a cause of the trouble.

EXAMPLE 7

Figure 9:
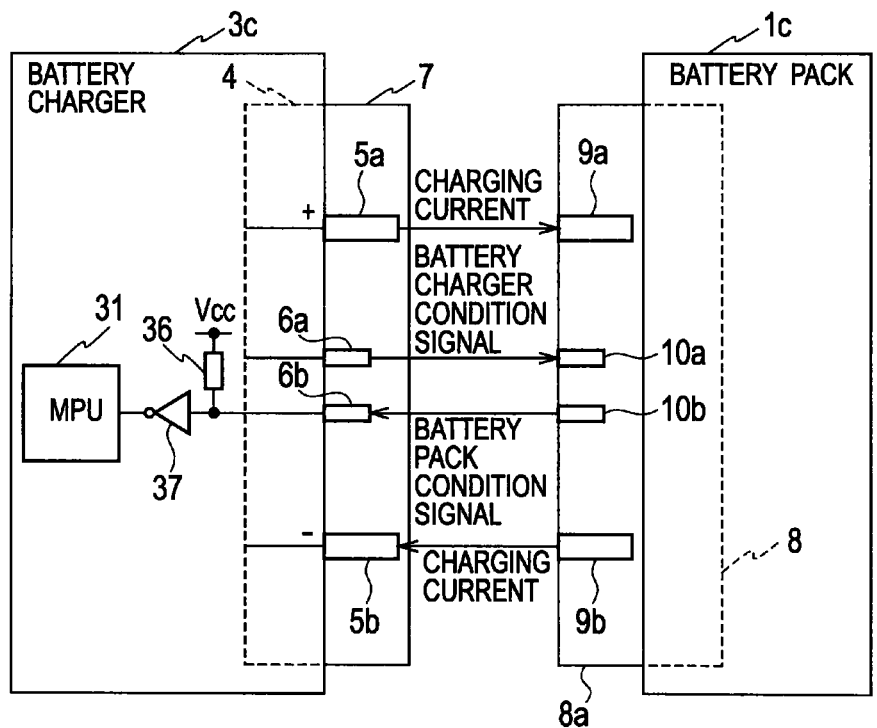
FIG. 9 is a diagram for explaining a function of connector pins for recharging in a battery pack system of Example 7.

FIG. 9 is a diagram for explaining a function of connector pins for recharging in a battery pack system of Example 7. In FIG. 9, a battery charger side connector 4 is provided in a battery charger 3c, and a battery pack side connector 8 is provided in a battery pack 1c. The battery pack side connector 8 is configured so as to be removably attachable from the battery charger side connector 4.

A charging current pin 5a, a charging current pin 5b, a battery charger condition signal pin 6a, and a battery pack condition signal pin 6b are provided in the battery charger side connector 4. Lengths of the battery charger condition signal pin 6a and the battery pack condition signal pin 6b are shorter than lengths of the charging current pins 5a and 5b.

A connector socket 8a is provided with the battery pack side connector 8. a groove 9a for engaging with the charging current pin 5a, a groove 9b for engaging with the charging current pin 5b, a groove 10a for engaging with the battery charger condition signal pin 6a, and groove 10b for engaging with the battery pack condition signal pin 6b are provided in the connector socket 8a.

Namely, when the battery charger side connector 4 is attached to the battery pack side connector 8 the respective battery charger pins 5a, 5b, 6a and 6b are attached to the respective grooves 9a, 9b, 10a and 10b, and when the battery charger side connector 4 is removed from the battery pack side connector 8 the respective battery charger pins 5a, 5b, 6a and 6b are removed from the respective grooves 9a, 9b, 10a and 10b.

A battery pack condition signal is input to the battery charger 3c via the battery pack condition signal pin 6b. The battery pack condition signal is configured to be in a condition that the battery pack 1c is in a normal condition with an L level. The battery charger 3c further includes an inverter 37 for inverting the battery pack condition signal input via the battery pack condition signal pin 6b so as to output the signal to the MPU 31, and a resistor 36 connected between a power source Vcc and an input side of the inverter 37.

In such a configuration, when the battery charger side connector 4 is connected to the battery pack side connector 8, the L level of the battery pack condition signal is inverted to be an H level. Then, when the H level is input to the MPU 31, the MPU 31 determines that the battery pack 1c is in a normal condition.

While, when the battery charger side connector 4 starts disconnecting the battery pack side connector 8, the battery charger condition signal pin 6a and the battery pack condition signal pin 6b disconnect the grooves 10a and 10b first. Thus, the battery pack condition signal and the battery charger condition signal are interrupted.

Then, the MPU 31 determines that the conditions of the battery pack 1c and the battery charger 3c are in an anomalous condition due to the interruption of the battery pack condition signal and the battery charger condition signal. As a result, the MPU 31 controls the current controller 32 so as to immediately interrupt the charging currents.

Moreover, the MPU 31 in the battery charger 3c controls the current controller 32 so as to immediately interrupt the charging currents when the battery pack condition signal becomes the H level, i.e. the battery pack 1c is in an anomalous condition. Therefore, the charging currents can be immediately interrupted when the battery charger side connector 4 starts disconnecting the battery pack side connector 8, whereby an electrical shock accident and the like can be avoided.

EXAMPLE 8

Figure 10:
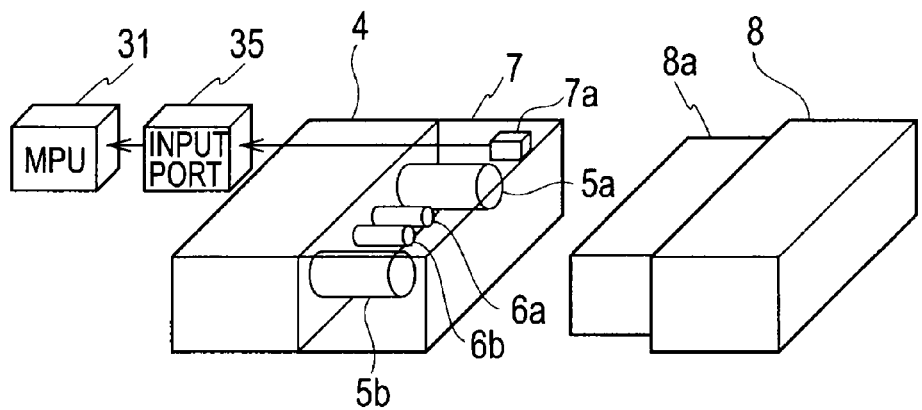
FIG. 10 is a view for explaining a function of a connecting/disconnecting detection of a connector for recharging in a battery pack system of Example 8.

FIG. 10 is a view for explaining a function of a connecting/disconnecting detection of a connector for recharging in a battery pack system of Example 8. Note that, the same components as Example 7 illustrated in FIG. 9 are indicated by the same numerals, and explanations thereof are omitted.

In FIG. 10, a cover 7 for covering the respective pins 5a, 5b, 6a and 6b of the battery charger side connector 4 is provided with the battery charger side connector 4. Therefore, the charging current pins 5a and 5b can be isolated externally, thereby avoiding an electrical shock accident.

In addition, a switch 7a for detecting a connection/disconnection of the battery charger side connector 4 with respect to the battery pack side connector 8 is provided in the cover 7, for example. When the battery charger side connector 4 starts disconnecting the battery pack side connector 8, a connection between a protrusion, not illustrated in the figure, provided in the connector socket 8a and the switch 7a is interrupted. Then, the switch 7a turns off, thereby transmitting an off signal to the MPU 31 via the input port 35.

When the MPU 31 detects the off signal from the switch 7a, the MPU 31 controls the current controller 32 so as to immediately interrupt the charging currents. Thus, the charging currents are immediately interrupted when the battery charger side connector 4 starts disconnecting. Accordingly, risk of an electrical shock accident caused by touching the exposed charging current pins 5a and 5b is reduced.

EXAMPLE 9

Figure 11:
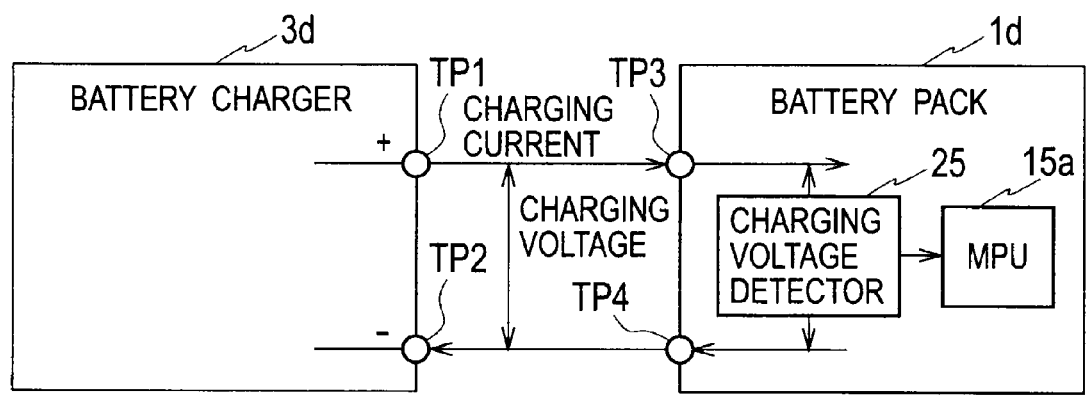
FIG. 11 is a diagram for explaining a function of a battery charger connecting detection in a battery pack system of Example 9.

FIG. 11 is a diagram for explaining a function of a battery charger connecting detection in a battery pack system of Example 9. Charging current terminals TP1 and TP2 of a battery charger 3d illustrated in FIG. 11 are connected to charging current terminals TP3 and TP4 of a battery pack 1d, respectively. Then, a charging voltage detector 25 provided in the battery pack 1d detects a voltage between the charging current terminals TP1 and TP2 of the battery charger 3d, and interrupts an MPU 15a in the battery pack 1d.

In such a configuration, not only the battery charger 3 including the communication I/F 33, the input port 34, and the output port 35, which are provided between the battery charger 3 and the battery pack 1 as illustrated in FIG. 3, but also a combination of the battery charger 3d and the battery pack 1d, terminals of which are providing only the charging current terminals, can control the charging currents from the battery charger to the battery pack. In other words, when the battery charger 3d not providing the battery charger condition signal is connected to the battery pack 1d, the connection of the battery charger 3d to the battery pack 1d can be detected only by use of the charging voltage by the charging voltage detector 25.

EXAMPLE 10

Figure 12:
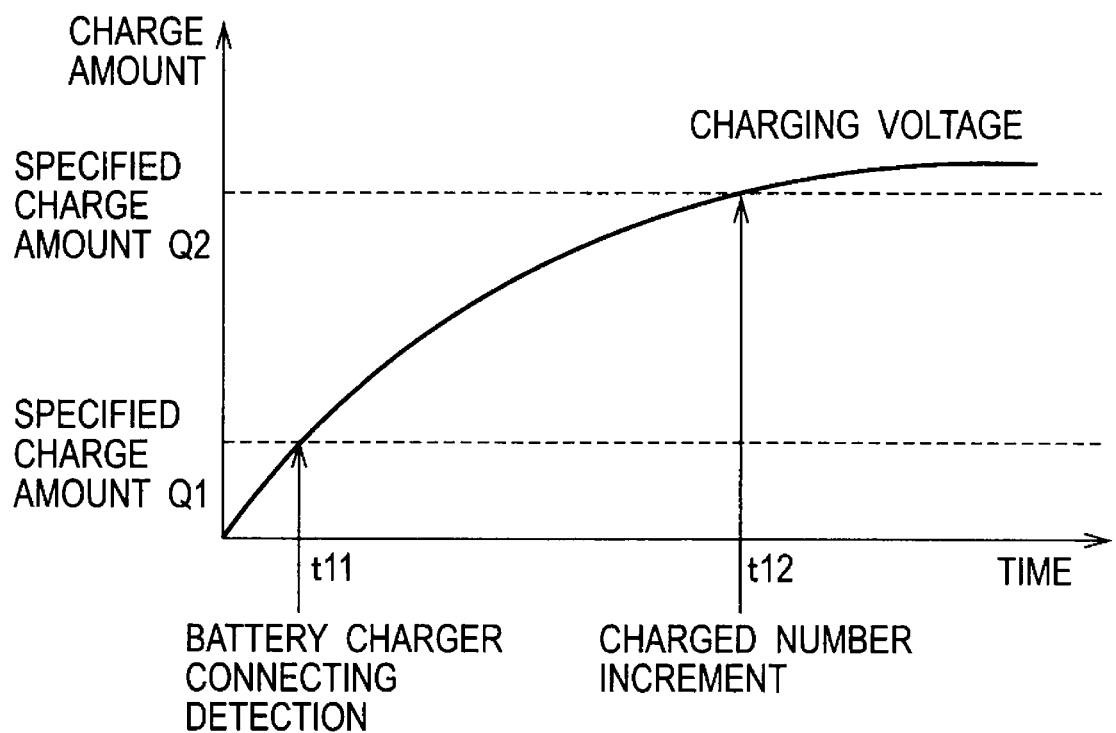
FIG. 12 is a diagram for explaining operations for measuring a charged number in a battery pack system of Example 10.

FIG. 12 is a diagram for explaining operations for measuring a charged number in a battery pack system of Example 10.

Example 10 is characterized by a measurement of the charged number of the batteries 11a to 11n.

The battery pack system of Example 10 confirms the connection between the battery charger 3 and the battery pack 1 by use of, e.g. the battery charger condition signal and the battery pack condition signal, and permits to recharge by specifying the charging currents and the like (similar as Example 1). Then, the voltage detector 13 detects voltages of the batteries 11a to 11n. As illustrated in FIG. 12, when the charge amount exceeds a specified charge amount (specified charge amount Q2 in FIG. 12), a counter, not illustrated in the figure, provided in the MPU 15 counts the present recharging as one of the charged number.

Meanwhile, when there is no handshake signal such as the battery charger condition signal and the battery pack condition signal between the battery charger 3 and the battery pack 1, the connection of the battery charger 3 is detected by the voltage detected by the charging voltage detector 25 as illustrated in FIG. 11. In this point, the voltage detector 13 detects the voltages of the batteries. Then, when the charge amount exceeds a threshold value, the counter, not illustrated in the figure, provided in the MPU 15 counts the present recharging as one of the charged number. Accordingly, the charged number of the batteries 11a to 11n is counted as accurately as possible.

Industrial Applicability

Since it is possible to recharge the battery pack in an optimal condition and in a short period of time according to the condition of the battery pack, the battery pack is superior especially for an application to purposes such as a hybrid vehicle, a running power source for an electrically power assisted cycle, and the like.

The invention claimed is:

1. A battery pack system, comprising:
    a battery charger comprising a battery charger side connector provided with a first charging current pin, a second charging current pin, a first signal pin, and a second signal pin, the first and second charging current pins for supplying currents, lengths of the first and second signal pins being shorter than lengths of the first and second charging current pins; and
    a rechargeable battery pack to be recharged by the battery charger comprising;
        a plurality of rechargeable batteries connected in series or in parallel,
        a battery pack side connector provided with a first groove for engaging with the first signal pin, a second groove for engaging with the second signal pin, a third groove for engaging with the first charging current pin and supplying the currents to the batteries, a fourth groove for engaging with the second charging current pin and supplying the currents to the batteries,
        a voltage detector for detecting voltages of the respective rechargeable batteries,
        a calculator for calculating optimal charging current values based on the voltages of the respective batteries detected by the voltage detector so as to recharge the respective batteries,
        a communicator for transmitting the optimal charging current values calculated by the calculator to the battery charger,
        an input circuit in which a battery charger condition signal indicating a condition of the battery charger is input from the battery charger via the first groove and the first signal pin,
        an output circuit that outputs a battery pack condition signal indicating a condition of the battery pack to the battery charger via the second groove and the second signal pin, and
        a controller for controlling the voltage detector, the calculator, the communicator, the input circuit, and the output circuit, wherein
    the battery charger comprises a current controller that supplies the currents according to the optimal charging current values from the battery pack to the batteries in the battery pack, and
    when engaging of the first groove and the first signal pin and engaging of the second groove and the second signal pin are canceled, the current controller stops supply of the currents.

2. The battery pack system of claim 1, wherein
    the battery pack further comprises a temperature sensor for measuring temperatures of the batteries, and
    the calculator calculates the optimal current values based on the voltages of the respective batteries detected by the voltage detector and the temperatures of the respective batteries measured by the temperature sensor.

3. The battery pack system of claim 1, wherein the battery pack further comprises a power supply that is activated by the battery charger condition signal input from the battery charger via the input circuit, and supplies a current for operating the controller to the controller.

4. The battery pack system of claim 1, wherein
    the battery pack further comprises a battery pack side memory,
    the battery charger further comprises a battery charger side memory, and
        each of the battery pack side memory and the battery charger side memory stores the battery charger condition signal and the battery pack condition signal in chronological order.

* * * * *